(12) United States Patent
McBee

(10) Patent No.: US 6,349,869 B1
(45) Date of Patent: Feb. 26, 2002

(54) WELDING CLAMP

(76) Inventor: David McBee, 115 April Dr., Blacksburg, SC (US) 29702

( * ) Notice: Subject to any disclaimer, the term of this patent is extended or adjusted under 35 U.S.C. 154(b) by 0 days.

(21) Appl. No.: 09/636,648

(22) Filed: Aug. 4, 2000

(51) Int. Cl.[7] ............................................. B23K 37/04
(52) U.S. Cl. ......................... 228/49.3; 29/272; 269/43
(58) Field of Search ............................... 228/49.3, 212, 228/213, 47.1; 29/272, 271, 281.5; 269/43, 87.2, 87

(56) References Cited

U.S. PATENT DOCUMENTS

| | | | | |
|---|---|---|---|---|
| 2,374,899 A | * | 5/1945 | Sasgen | |
| 3,596,898 A | * | 8/1971 | Hilburn | |
| 3,811,668 A | * | 5/1974 | Kotter | |
| 4,105,344 A | * | 8/1978 | Rousom | |
| 4,195,828 A | * | 4/1980 | Peterson | |
| 4,306,345 A | * | 12/1981 | Dearman | |
| 4,344,215 A | * | 8/1982 | Dearman | |
| 4,483,059 A | * | 11/1984 | Dearman | |
| 4,553,305 A | * | 11/1985 | Dearman | |
| 4,586,647 A | * | 5/1986 | Dearman | |
| 4,750,662 A | * | 6/1988 | Kagimoto | |
| 5,135,209 A | * | 8/1992 | Penny | |
| 5,839,647 A | | 11/1998 | Orne | |
| 6,161,296 A | * | 12/2000 | Davio | |

* cited by examiner

Primary Examiner—M. Alexandra Elve
Assistant Examiner—Jonathan Johnson
(74) Attorney, Agent, or Firm—Dority & Manning, PA

(57) ABSTRACT

A welding clamp is provided which attaches along its base portion to the receiving plate of a conventional jackstand. An upright member extends from the base and is angled in a direction which extends toward a vertical axis defined by the jackstand. The support member provides a sleeve for receiving in an adjustable manner a horizontal arm. One end of the arm defines a threaded aperture through which a bolt is positioned. The bolt is used to secure a segment of pipe within the pipe stand without a need for temporary tacking welds between the pipe and the jackstand.

5 Claims, 3 Drawing Sheets

WELDING CLAMP

FIELD OF THE INVENTION

This invention is directed towards a welding clamp.

BACKGROUND OF THE INVENTION

This invention generally relates to a process and apparatus for tacking and welding together segments of pipe supported by a jackstand.

Typical methods of welding pipe involves placing the pipe on a jackstand and tack welding the pipe to the stand. After the fitting has been tacked to pipe, the pipe must be separated from the stand. Thereafter, tacks securing pipe in jackstand must be removed from the pipe. This is a cumbersome and time-consuming operation.

Various types of conventional clamps, such as a C-clamp, are at times used in an effort to secure a pipe to a jackstand without the need of a temporary weld. However, conventional C-clamps and similar apparatuses are not suited for securing a segment of pipe to a jackstand in a sufficiently secure manner that permits subsequent pipe welding. Accordingly, there is room for improvement within the art of pipe clamps which facilitate the welding process.

SUMMARY OF THE INVENTION

The present invention provides a welding clamp which is secured by its base to the receiving plate of a conventional jackstand. An upright member extends from the base and is angled in a direction which extends toward a vertical axis defined by the jackstand. The support member defines a sleeve along an upper end, the sleeve configured for and receiving a substantially horizontal arm in a slideable and adjustable engagement. One end of the arm defines a threaded aperture through which a bolt is positioned. A first end of the bolt defines a handle, while a lower second end of a bolt defines a pivoting anchor. By movement of the sliding arm, the bolt and pivoting anchor may be centered with respect to the receiving plate of the jackstand. The threaded bolt and attached anchor can then be used to engage and secure a length of pipe placed within the jackstand.

In one embodiment of the invention, the welding clamp comprises a threaded bolt having a first end and a second end, the second end defining a terminal anchor; an arm defining a threaded aperture at a first end, the threaded aperture operatively engaging the threaded bolt; a sleeve adapted for receiving and supporting therethrough the arm, the sleeve carried by a first end of a support member, the support member extending beneath a plane defined by a lower edge of the arm; a base, the base connected to a second end of the support member, the base further defining a notch within a sidewall of the base, the base adapted for receiving an edge of a jackstand support plate; a threaded fastener operatively engaging an aperture defined by the base, a first end of the fastener in selective engagement with the notch.

It is another aspect of the present invention to provide a process of securing a segment of pipe within a jackstand for subsequent welding which comprises the steps of: supplying a jackstand having a receiving plate; placing within the receiving plate a segment of pipe; providing a welding clamp having a base which is reversibly attached to an edge of the receiving plate and further defining a sliding arm member which extends above the segment of pipe, the arm member carrying along one end a threaded bolt, the threaded bolt used to apply a securing and downwardly directed force along the upper surface of the segment of pipe; welding the segment of pipe to a second segment of pipe; and, removing the now welded pipe from the welding clamp.

These and other embodiments and features of the invention will become still further apparent from the accompanying description, appended claims, and drawings.

DETAILED DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same apparatus. To avoid redundancy, detailed descriptions of much of the apparatus once described in relation to one figure is not repeated in the descriptions of subsequent figures. However, such apparatuses are labeled with the same reference numbers.

Figure 1:
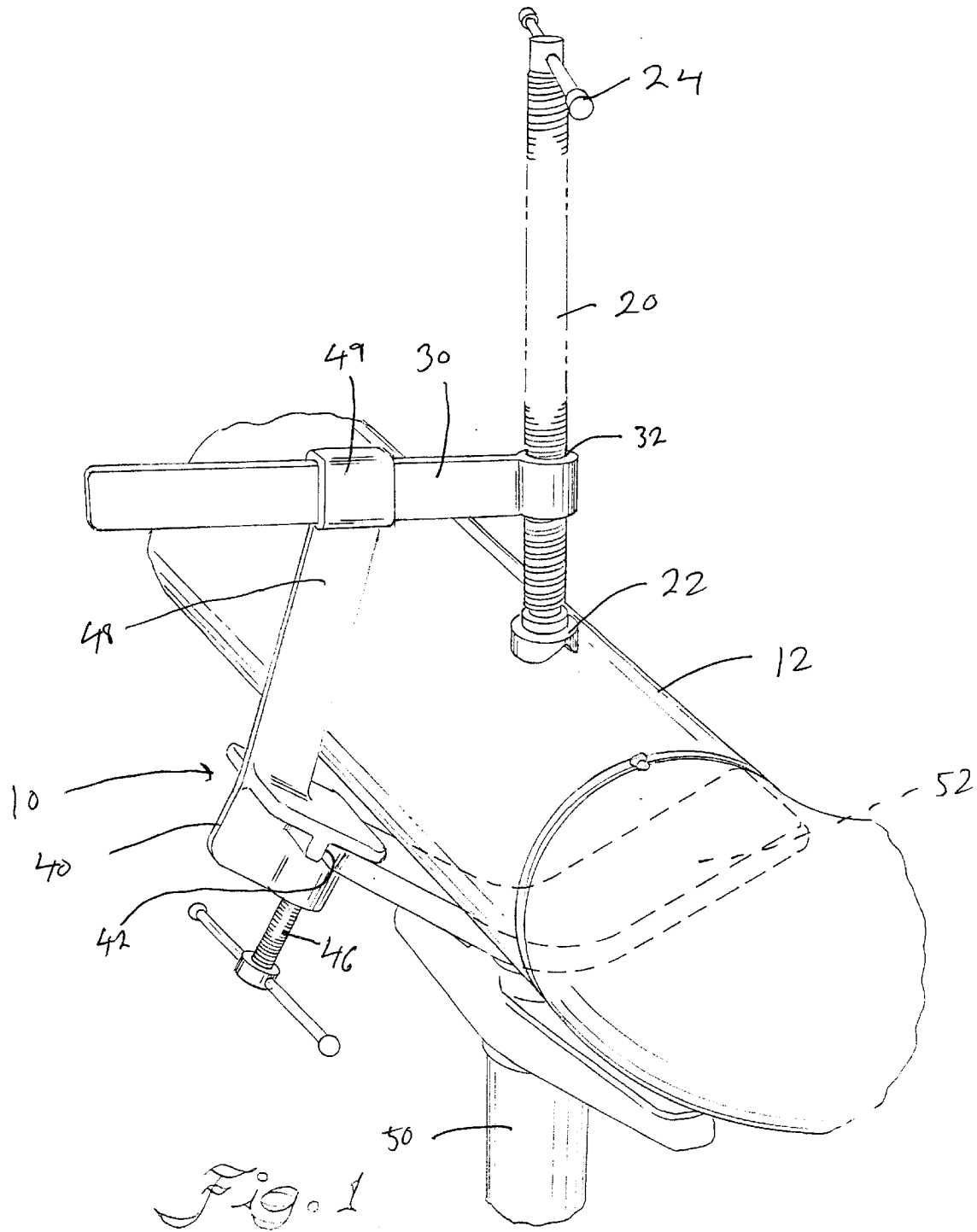
FIG. 1 is a perspective view of a preferred embodiment of a welding clamp in an operative environment in which the welding clamp is mounted to a jackstand and the welding clamp is further used to engage a segment of pipe within the jackstand.

Referring first to FIG. 1, there is illustrated a welding clamp 10 used to secure a pipe 12 to a plate 52 of a jackstand 50. The welding clamp 10 has a threaded bolt 20, bolt 20 defining a handle 24 along a first end and an anchor 22 on the second end. Bolt 20 operatively engages a threaded aperture 32 which is defined along a first end of a support arm 30. As best seen in reference to FIGS. 1 and 2, support arm 30 is carried within a sleeve 49. Preferably, arm 30 and bolt 20 are perpendicular to each other.

Sleeve 49 is attached to an upper end of an upright support member 48. Support member 48 is, in turn, attached along a lower end to a base 40. Base 40 defines a notch 42 along an inner side wall, notch 42 adapted for receiving an edge of plate 52 of the jackstand 50. The base 40 is in further communication with a threaded bolt 46. Threaded bolt 46 traverses a portion of base 40 and is in communication with an interior space defined by notch 42. Threaded bolt 46 thus provides a securing mechanism for positioning the base to the edge of plate 52.

As best seen in reference to FIG. 1, welding clamp 10 is attached to jackstand 50 by securing notch 42 of base member 40 to an edge of receiving plate 52. Threaded bolt 46 is used to secure the base to the plate 52. The securing end of bolt 46 has a substantially flat terminal end to facilitate engagement of the receiving plate within notch 42.

A segment of pipe 12 may then be placed within the receiving plate 52 of jackstand 50. Arm 30 is placed within sleeve 49 so as to align a vertical axis of threaded bolt 20 along the outer wall of pipe 12. In a preferred embodiment, threaded rod 20 is aligned with respect to pipe 12 such that the longitudinal axis of rod 20 is perpendicular to and intersects with the longitudinal axis of pipe 12.

In a preferred embodiment, anchor 22 may be attached along a pivot to threaded bolt 20 and thereby provide increased flexibility in the attachment of the anchor to the adjacent pipe wall. Such pivoting attachment mechanisms are conventional within the art and are commonly provided on C-clamps.

Figure 3:
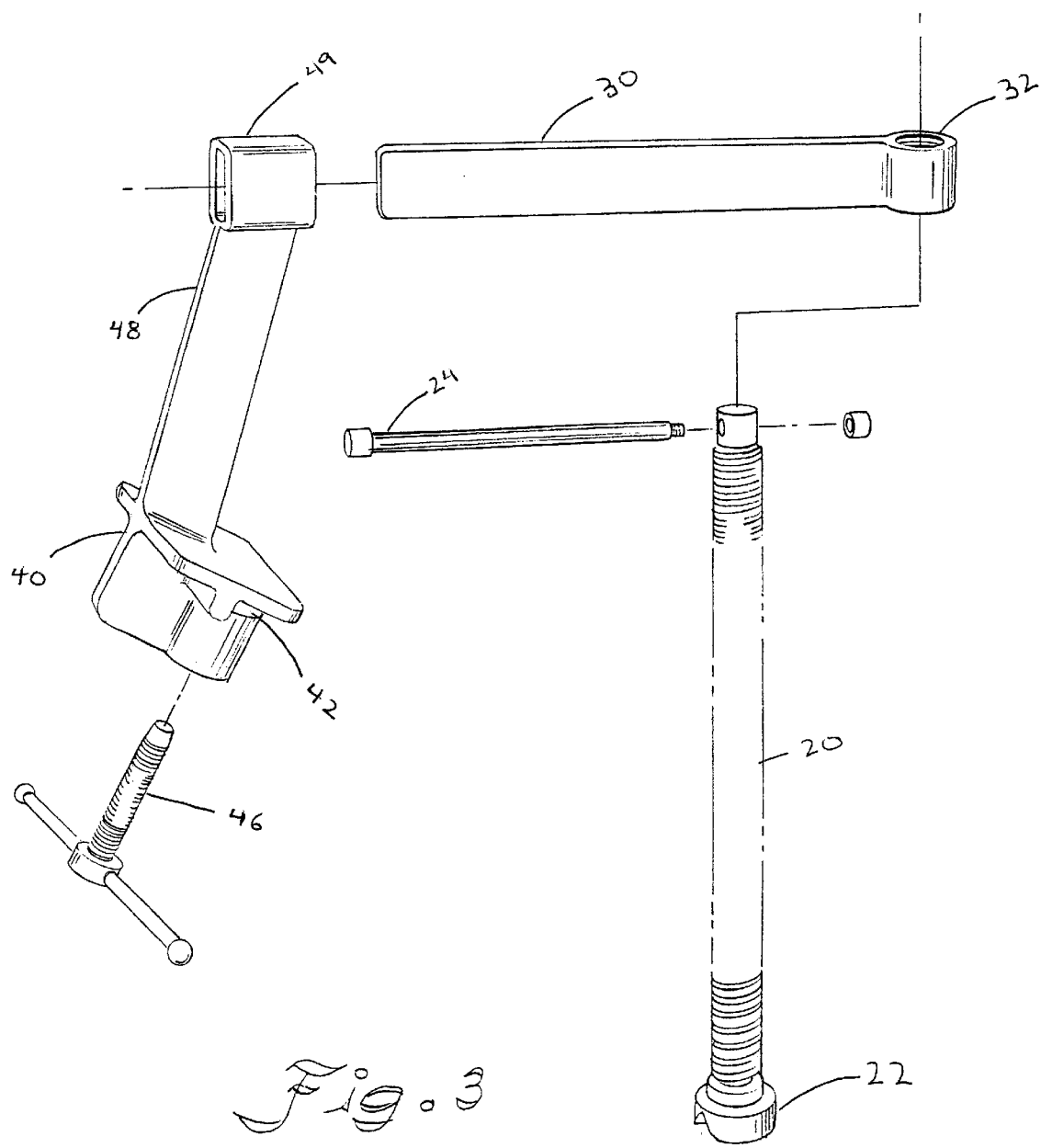
FIG. 3 is an exploded perspective view of the components of the welding clamp seen in FIGS. 1 and 2.

As best seen in reference to FIG. 3, handle 24 is of conventional design in that the handle traverses one end of the threaded bolt 20 and it is designed to slide along a handle length so as to increase leverage during tightening and untightening steps. The large diameter caps on each end of handle 24 maintain the handle in proper position relative to the threaded bolt. Further, since handle 24 transverses bolt 20, handle 24 also operates as a stop member to prevent the removal of bolt 20 from the aperture 32. A similar handle is provided with respect to threaded fastener 46 and operates in a similar manner.

Figure 2:
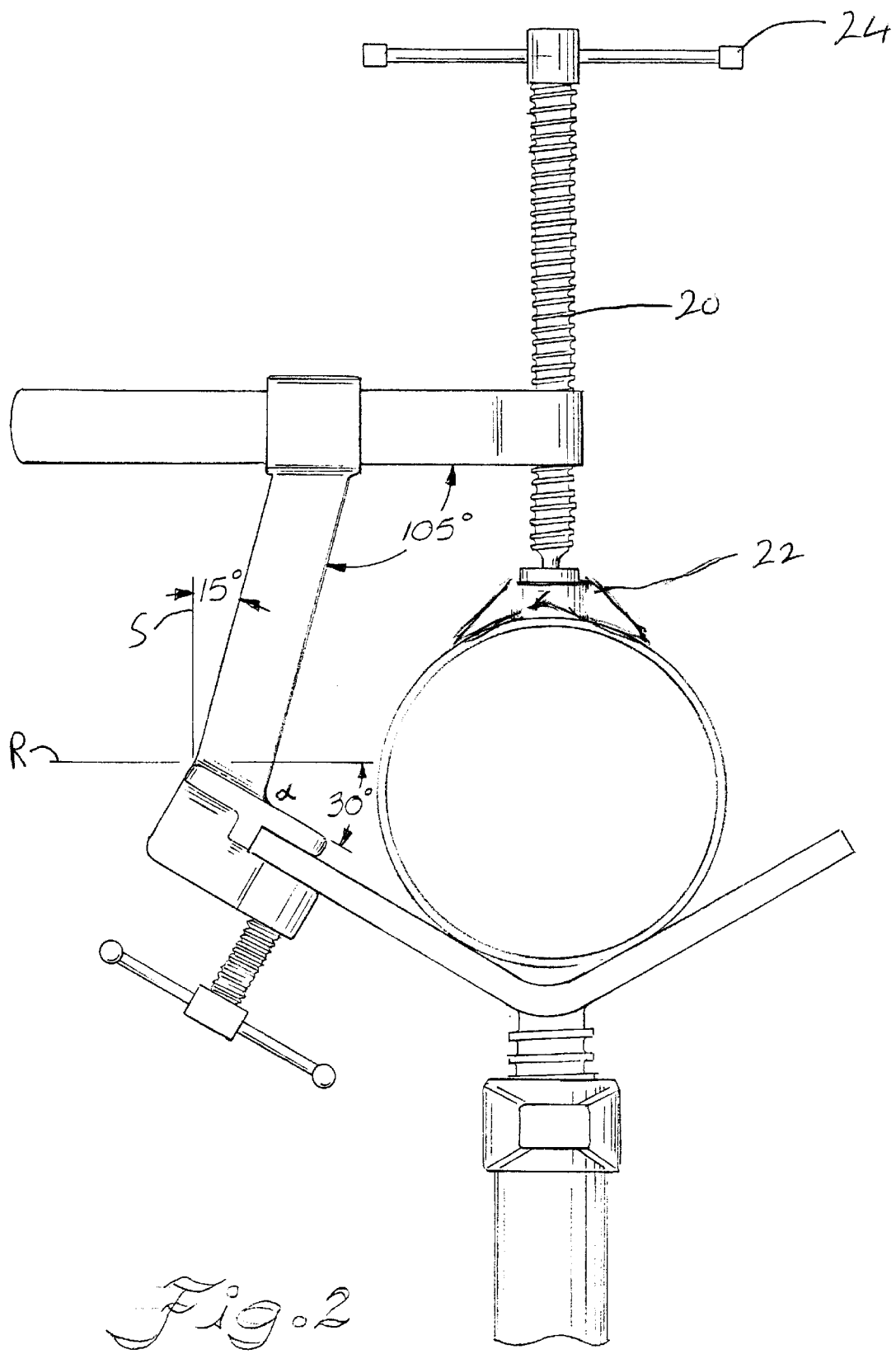
FIG. 2 is a side elevation view of the welding clamp, jackstand, and pipe as seen in FIG. 1.

As best seen in reference to FIG. 2, arm 30 forms a right angle with respect to the engaged bolt 20. Support member 48 is offset at an angle of about 15° from normal relative to a reference line parallel to threaded bolt 20. Base 40 defines an additional angle α of about 30° between an upper surface of notch 42 and reference line "R" as set forth in FIG. 2. Reference lines "R" and "S" of FIG. 2 are perpendicular to each other with reference line "R" being substantially parallel to arm 30 and reference line "S" being parallel to the axis of threaded bolt 20.

In the preferred illustrated embodiment, base 40 and upright support 48 may be molded as a unitary structure. As such, a fixed, non-adjustable angle is provided between the base 40 and the upright member 48. However, it is envisioned that a separate base and separate upright member may be attached by an adjustable pivot which would allow variation in the selected angle between the base and the upright member. A similar pivoting adjustment could be provided by a separate sleeve attached along a pivot or other moveable attachment mechanism to the upper portion of support member 48. So long as the pivoting portions may be firmly locked in a final clamping position, the welding clamp is operational and may facilitate adjustments with respect to various diameters of pipe.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. A pipe welding clamp comprising:

a threaded bolt having a first end and a second end, the second end defining a terminal anchor;

an arm defining a threaded aperture at a first end, the threaded aperture operatively engaging the threaded bolt;

a sleeve adapted for receiving and supporting therethrough the arm, the sleeve carried by a first end of a support member, the support member extending beneath a plane defined by a lower edge of the arm;

a base, the base connected to a second end of the support member, the base further defining a notch within a sidewall of the base, the base adapted for receiving an edge of a jackstand support plate; and, a threaded fastener operatively engaging an aperture defined by the base, a first end of the fastener in selective engagement with the notch.

2. The pipe welding clamp according to claim 1 wherein the arm is substantially perpendicular to the threaded bolt.

3. The pipe welding clamp according to claim 1 wherein the arm and the support member extending beneath the lower edge of the arm defines an interior angle of substantially about 105°.

4. The pipe welding clamp according to claim 1 wherein an interior angle is defined between an upper surface of the base and a horizontal reference line, intersecting support member, reference line being parallel to the lower edge of arm.

5. The pipe welding clamp according to claim 1 wherein the notch extends the length of the sidewall of the base.

* * * * *